United States Patent
Yamaguchi et al.

(10) Patent No.: US 10,439,666 B2
(45) Date of Patent: Oct. 8, 2019

(54) ELECTRONIC APPARATUS

(71) Applicant: FUJITSU LIMITED, Kawasaki-shi, Kanagawa (JP)

(72) Inventors: Shingo Yamaguchi, Kawasaki (JP); Satoshi Watanabe, Setagaya (JP); Satoshi Kanbayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/898,787

(22) Filed: Feb. 19, 2018

(65) Prior Publication Data

US 2018/0278288 A1    Sep. 27, 2018

(30) Foreign Application Priority Data

Mar. 22, 2017  (JP) ................. 2017-056516

(51) Int. Cl.
| | |
|---|---|
| *G06F 1/16* | (2006.01) |
| *H04M 1/02* | (2006.01) |
| *H04B 1/3888* | (2015.01) |
| *G06F 3/01* | (2006.01) |
| *G06F 3/041* | (2006.01) |

(52) U.S. Cl.
CPC ......... *H04B 1/3888* (2013.01); *G06F 1/1626* (2013.01); *G06F 1/1637* (2013.01); *G06F 1/1643* (2013.01); *G06F 1/1656* (2013.01); *G06F 3/016* (2013.01); *G06F 3/041* (2013.01); *H04M 1/0266* (2013.01)

(58) Field of Classification Search
CPC ... H04B 1/3888; G06F 1/1626; G06F 1/1643; G06F 3/016; G06F 3/041; H04M 1/0266
See application file for complete search history.

(56) References Cited

U.S. PATENT DOCUMENTS

| | | | |
|---|---|---|---|
| 2004/0150319 A1* | 8/2004 | Tomimatsu | ......... H01L 27/3246 313/495 |
| 2013/0331150 A1 | 12/2013 | Butsusaka et al. | |
| 2014/0268298 A1* | 9/2014 | Hendriks | ............. G02B 26/005 359/290 |

FOREIGN PATENT DOCUMENTS

| | | |
|---|---|---|
| JP | 2013-257662 | 12/2013 |
| WO | 2012/117738 | 9/2012 |

* cited by examiner

*Primary Examiner* — Hoa C Nguyen
(74) *Attorney, Agent, or Firm* — Fujitsu Patent Center

(57) ABSTRACT

An electronic apparatus includes a mounting plate, a panel mounted to the mounting plate, a through-hole that penetrates the mounting plate in a direction of thickness of the mounting plate, and a bonding member that is buried in the through-hole and fixes the panel to the mounting plate, wherein an opening of the through-hole gradually grows large in the direction of the thickness of the mounting plate from a side where the panel is mounted.

17 Claims, 15 Drawing Sheets

ELECTRONIC APPARATUS

CROSS-REFERENCE TO RELATED APPLICATION

This application is based upon and claims the benefit of priority of the prior Japanese Patent Application No. 2017-56516, filed on Mar. 22, 2017, the entire contents of which are incorporated herein by reference.

FIELD

The embodiments discussed herein are related to an electronic apparatus.

BACKGROUND

Some electronic apparatuses have a touch panel supported on a lower casing with an elastic member interposed therebetween. The touch panel, the elastic member, and the lower casing are coupled by using a bonding member. The elastic member of such an electronic apparatus is in the form of a frame that is substantially identical in outer shape to the touch panel. Each edge of the frame includes a plurality of through-holes. The through-holes are filled with a heat-shrinkable member that penetrates the front and back surfaces of the elastic member.

For mounting structures that use adhesive to mount a panel to a mounting plate, it is desirable to enable the panel to be mounted to the mounting plate even if the adhesive has relatively low bond strength to the mounting plate.

The following is a reference document.
[Document 1] International Publication Pamphlet No. WO 2012/117738.

SUMMARY

According to an aspect of the invention, an electronic apparatus includes a mounting plate, a panel mounted to the mounting plate, a through-hole that penetrates the mounting plate in a direction of thickness of the mounting plate, and a bonding member that is buried in the through-hole and fixes the panel to the mounting plate, wherein an opening of the through-hole gradually grows large in the direction of the thickness of the mounting plate from a side where the panel is mounted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An electronic apparatus according to a first embodiment will be described in detail with reference to the drawings.

Figure 1:
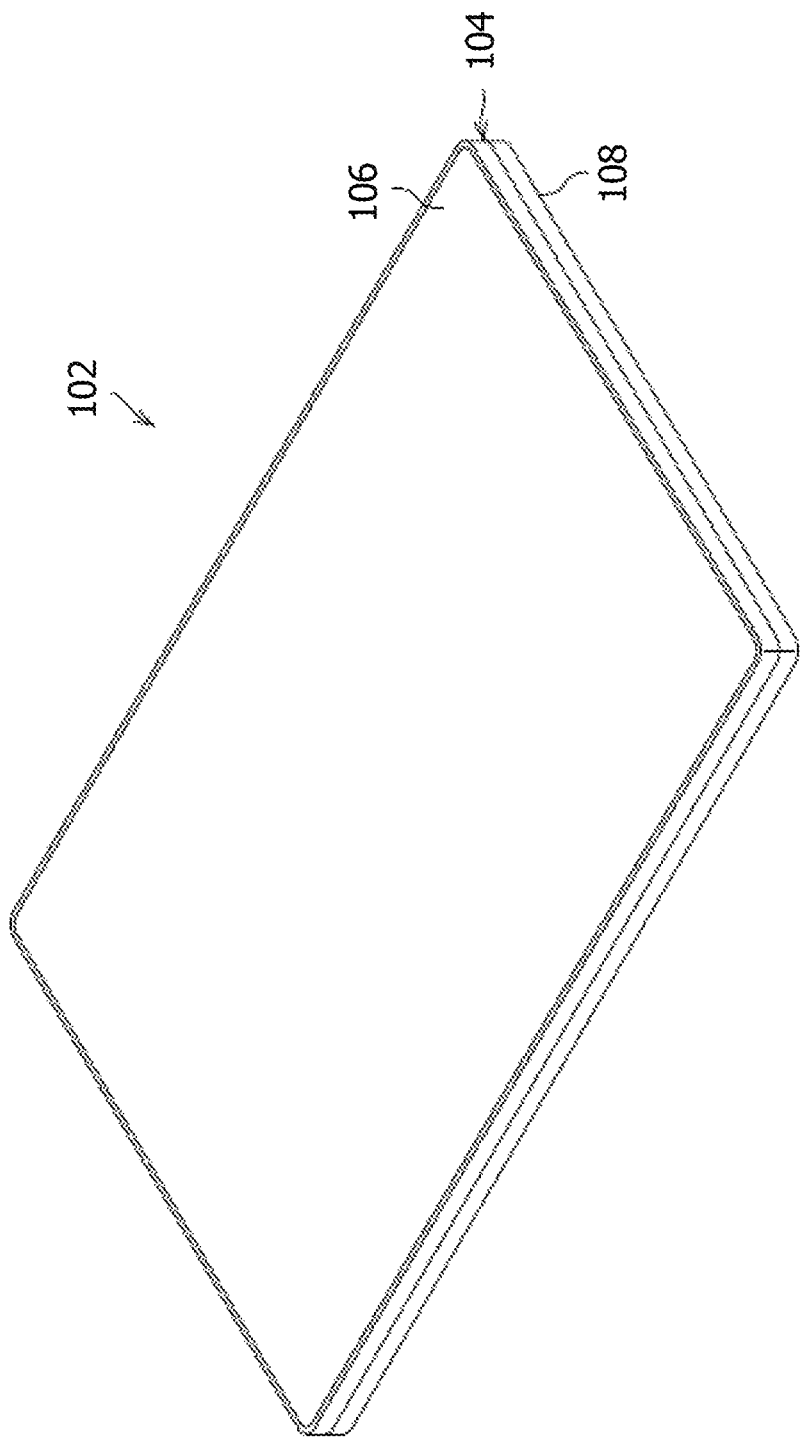
FIG. 1 is a perspective view of an electronic apparatus according to a first embodiment.
Figure 2:
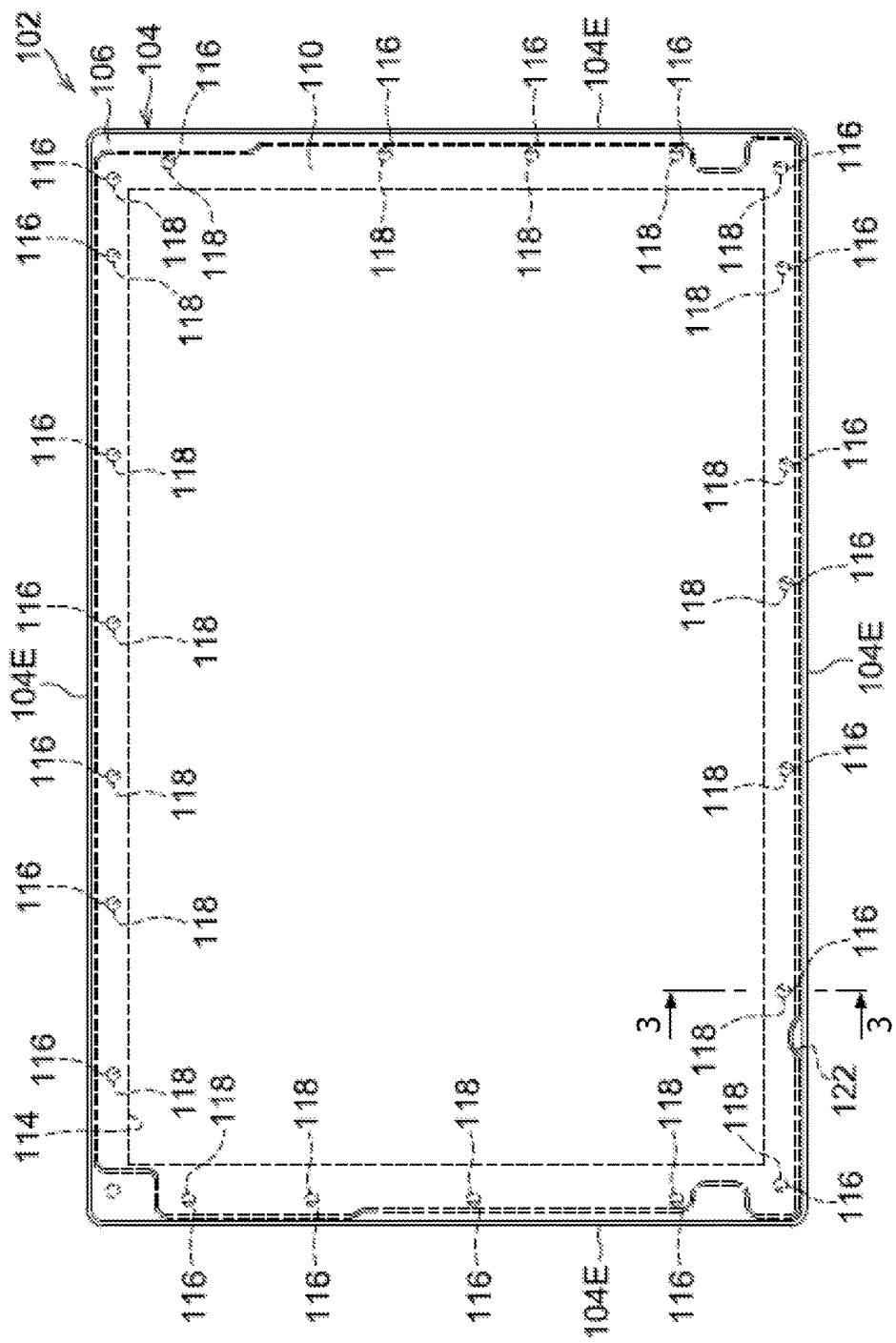
FIG. 2 is a plan view of the electronic apparatus according to the first embodiment.

As illustrated as FIGS. 1 and 2, an electronic apparatus 102 according to a first embodiment has a frame plate 104, a panel 106, and a cover 108. The electronic apparatus 102, which has a plate-like shape as a whole, is sometimes referred to as tablet computer.

The frame plate 104, which is a frame-like member, represents an example of a mounting plate. As illustrated as FIG. 3, one surface of the frame plate 104 serves as a panel-mounting surface 104P to which the panel 106 is mounted. The other surface of the frame plate 104 serves as a cover-mounting surface 104C to which the cover 108 (see FIG. 1) is mounted. The cover 108 may be integrated with the frame plate 104.

The panel 106 according to the first embodiment functions as a display for the electronic apparatus 102 to display various information. For example, a display device is disposed inside the electronic apparatus 102, and this display device is viewed from the outside through the panel 106. Alternatively, the panel 106 may constitute a part of the display device. By contrast, the cover 108 is a plate-like member that covers the side opposite to the panel 106.

Figure 3:
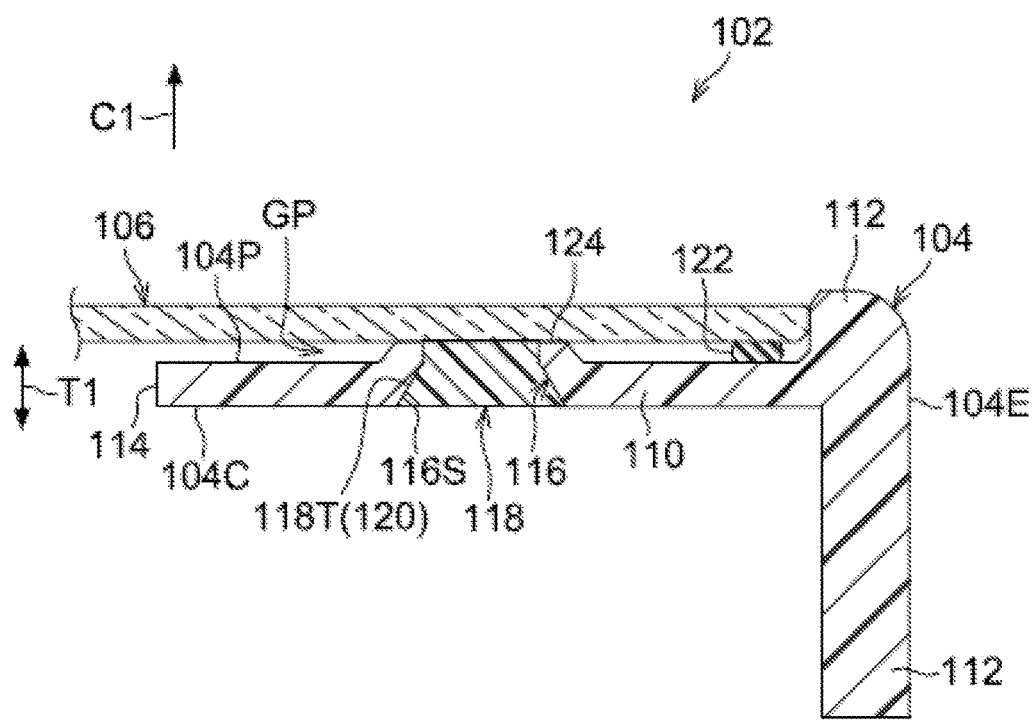
FIG. 3 is a cross-sectional view, taken along a line III-III in FIG. 2, of the electronic apparatus according to the first embodiment.

As illustrated as FIGS. 2 and 3, the frame plate 104 has four edges 104E. The frame plate 104 has, inside the area bounded by the four edges 104E, a frame portion 110 formed in the shape of a rectangular frame. A side wall 112 is provided around the frame portion 110 so as to extend toward the panel-mounting surface 104P and the cover-mounting surface 104C. The panel 106 is located inside the side wall 112, and covers an opening 114 of the frame portion 110. The cover 108 also covers the opening 114 on the side opposite to the panel 106. A substrate on which an electronic component is mounted and various members are contained in the space between the panel 106 and the cover 108.

The frame portion 110 includes a plurality of through-holes 116. As illustrated as FIG. 2, the through-holes 116 are arranged along each of the four edges 104E of the frame plate 104 and spaced at intervals from each other. The through-holes 116 may not be spaced at uniform intervals from each other. Since the frame plate 104 according to the first embodiment has the opening 114, the opening 114 is surrounded by the through-holes 116.

Figure 4:
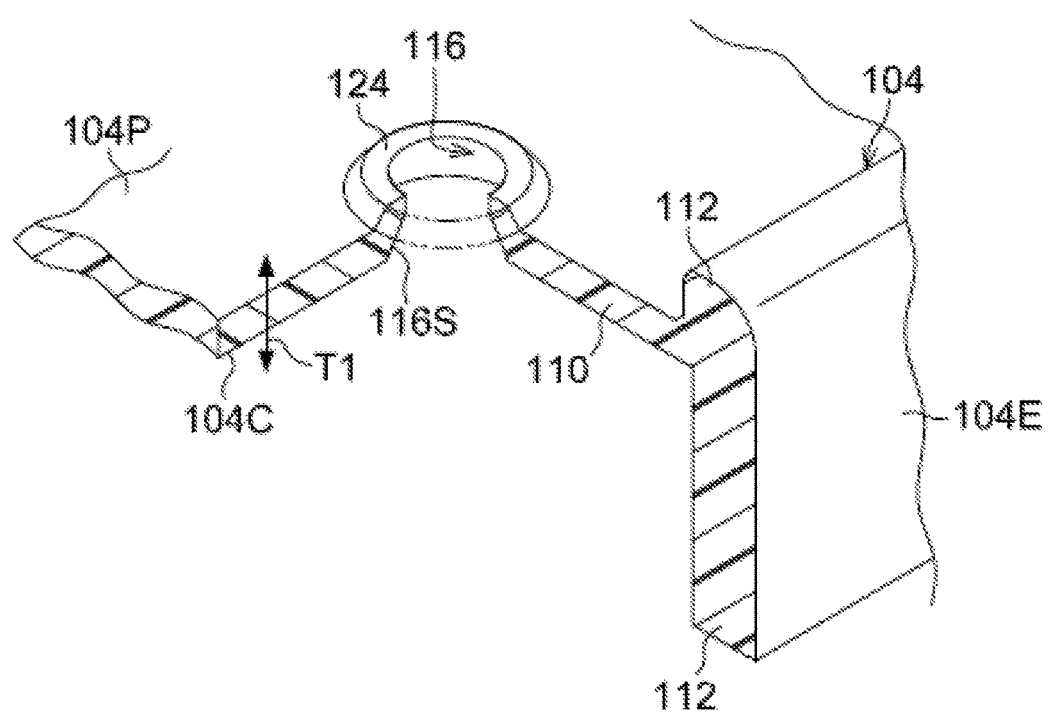
FIG. 4 is a perspective view, partially cut away in the vicinity of a through-hole, of a frame plate of the electronic apparatus according to the first embodiment.
Figure 5:
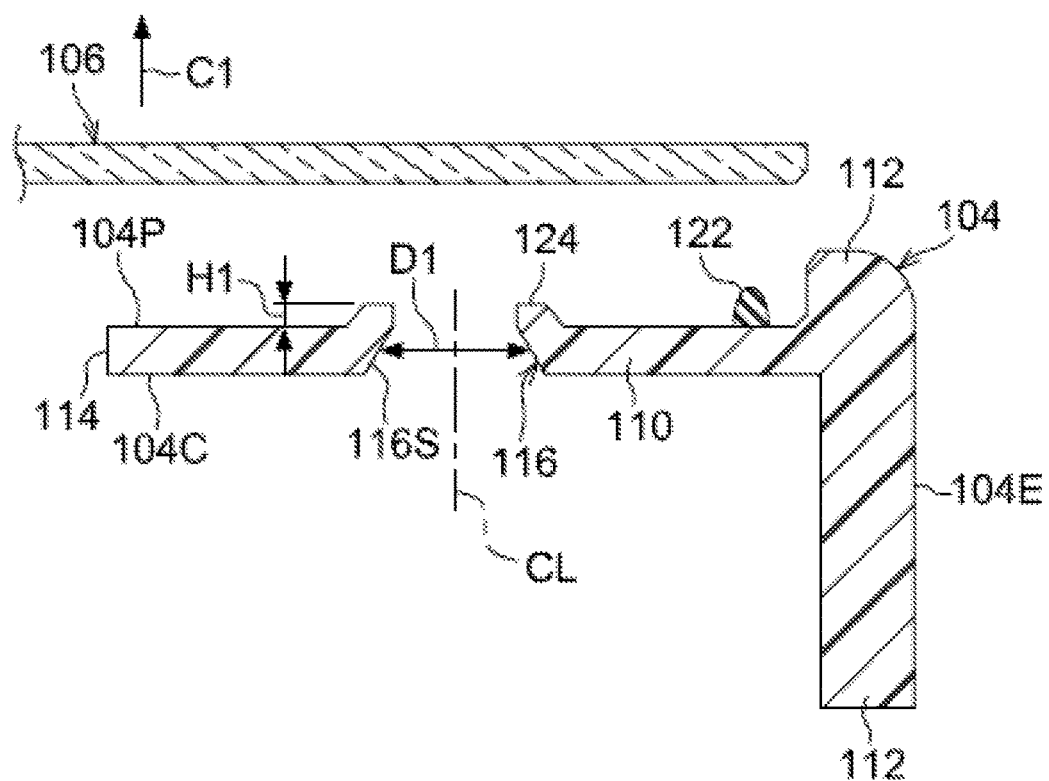
FIG. 5 is a cross-sectional view of the electronic apparatus according to the first embodiment, illustrating a state in which a panel is being mounted to a frame plate.

As illustrated as FIGS. 4 and 5, each of the through-holes 116 penetrates the frame portion 110 in the direction of plate thickness. In accordance with the first embodiment, the through-hole 116 is in the shape of a truncated cone with its inner diameter D1 (see FIG. 5) gradually diminishing from the cover-mounting surface 104C toward the panel-mounting surface 104P, in other words, in the direction in which the panel 106 moves away from the frame plate 104 (in the direction indicated by an arrow C1). Thus, the surface defining the through-hole 116 is an inclined surface 116S that is inclined toward the center line CL of the through-hole 116 as the inclined surface 116S extends in the direction of the arrow C1. The inclined surface 116S extends around the entire circumference of the surface defining the through-hole 116.

A bonding member 118 is applied onto the through-hole 116. In accordance with the first embodiment, the bonding member 118 is made of an adhesive that exhibits a relatively high bond strength to the material forming the panel 106 but exhibits a relatively low bond strength to the material forming the frame plate 104.

As illustrated as FIG. 3, the bonding member 118 is bonded to the panel 106 with a part of the bonding member 118 exposed from the through-hole 116 toward the panel 106.

The bonding member 118 is partially in contact with the surface defining the through-hole 116. In accordance with the first embodiment, the through-hole 116 has the inclined surface 116S. Thus, a contact portion 118T, which is a portion of the bonding member 118 in contact with the inclined surface 116S, also represents a portion of the bonding member 118 that is opposed to the frame plate 104 on the side opposite to the panel 106. That is, the contact portion 118T, which is a portion of the bonding member 118 in contact with the inclined surface 116S, represents an example of an opposed member 120.

An elastic member 122 is disposed between the frame plate 104 and the panel 106. In accordance with the first embodiment, as illustrated as FIG. 2, in plan view of the frame plate 104, the elastic member 122 has the shape of a closed curve that surrounds the opening 114 of the frame plate 104 at a location further outside the through-hole 116 (near the outer edges of the frame plate 104).

As illustrated as FIG. 3, the elastic member 122 is elastically compressed while being sandwiched between the frame portion 110 of the frame plate 104 and the panel 106.

The elastic member 122 is thus in close contact with the frame plate 104 and the panel 106. This reduces intrusion of foreign matter (such as a liquid or dust) into the inner space bounded by the elastic member 122. Examples of the material forming the elastic member 122 include a thermoplastic elastic body, an ultraviolet-curing elastic body, rubber, and a resin foam (closed-cell resin foam).

The thermoplastic elastic body is in an uncured state prior to heating, and cures to have a predetermined elasticity when heated. The ultraviolet-curing elastic body is in an uncured state prior to heating, and cures to have a predetermined elasticity when irradiated with ultraviolet rays. That is, when in its uncured state, thermoplastic elastic body or ultraviolet-curing elastic body may be applied to the frame plate 104 or the panel 106 in a desired shape and over a desired area. This allows for a higher degree of freedom in the shape and application location of thermoplastic elastic body or ultraviolet-curing elastic body.

If a material such as rubber or resin foam is to be used as the elastic member 122, this may be accomplished simply by forming such rubber or resin foam in a predetermined shape in advance, and then placing the rubber or resin foam having the predetermined shape between the frame plate 104 and the panel 106. Thus, using a material such as rubber or resin foam allows for easy handling. A resin foam may be adjusted in expansion ratio to have a predetermined modulus of elasticity.

Since the elastic member 122 is elastically compressed between the frame plate 104 and the panel 106, the elastic member 122 exerts an elastic force on the panel 106 in the direction that causes the panel 106 to move away from the frame plate 104 (in the direction of the arrow C1).

The elastic reaction force of the elastic member 122 may be of such a magnitude that does not cause deformation (such as waviness or deflection) in the panel 106 while allowing close contact of the elastic member 122 with the frame plate 104 and the panel 106. For instance, if the panel 106 has a high rigidity, deformation of the panel 106 may be minimized even if the elastic member 122 exerts a large elastic reaction force. As for the hardness of the elastic member 122, for example, an elastic body with a hardness of 20 degrees as measured by using a Type A durometer (conforming to the standards of JIS K 6253, ISO 7619, and ASTM D 2240) may be used. It is to be noted, however, that even if the above-mentioned hardness of an elastic body exceeds 20 degrees, the elastic reaction force may be adjusted by changing, for example, the shape of the elastic member 122.

The panel-mounting surface 104P of the frame plate 104 includes a projection 124. The projection 124, which is provided in correspondence with each of the through-holes 116, is in the shape of a closed curve surrounding the through-hole 116. In the example illustrated as FIGS. 3 and 4, the through-hole 116 is circular in shape when viewed in the direction of thickness of the frame plate 104 (in the direction of the arrow T1). A through-hole 117, which is concentric and contiguous with the through-hole 116, is also provided inside the projection 124. The projection 124 is a part that, with the bonding member 118 applied onto the through-hole 116 in its uncured state, minimizes flowing out of the bonding member 118 to the surroundings of the through-hole 116 along the panel-mounting surface 104P. The projection 124 represents an example of a first protrusion.

The height H1 (see FIG. 5) of the projection 124 from the panel-mounting surface 104P is smaller than the thickness of the elastic member 122 in its natural state (when not compressed by the frame plate 104 and the panel 106). This ensures that when the panel 106 moves toward the frame plate 104 against the elastic reaction force of the elastic member 122, the panel 106 comes into contact with the projection 124, thus creating a gap GP between the frame plate 104 and the panel 106 that is equal to the height H1 of the elastic member 122. The projection 124 thus restricts the amount of compression of the elastic member 122, and also represents an example of a second protrusion.

As described above, in accordance with the first embodiment, the projection 124 doubles as the first protrusion and the second protrusion, and is provided in the panel-mounting surface 104P integrally with the frame plate 104.

Next, a manufacturing method for and operation of the electronic apparatus 102 according to the first embodiment will be described.

For cases where an elastic body formed in a predetermined shape in advance is used as the elastic member 122, the elastic member 122 is disposed at a predetermined location on the frame plate 104 as illustrated as FIG. 5. Alternatively, the elastic member 122 may be disposed at a predetermined location on the panel 106.

Figure 6:
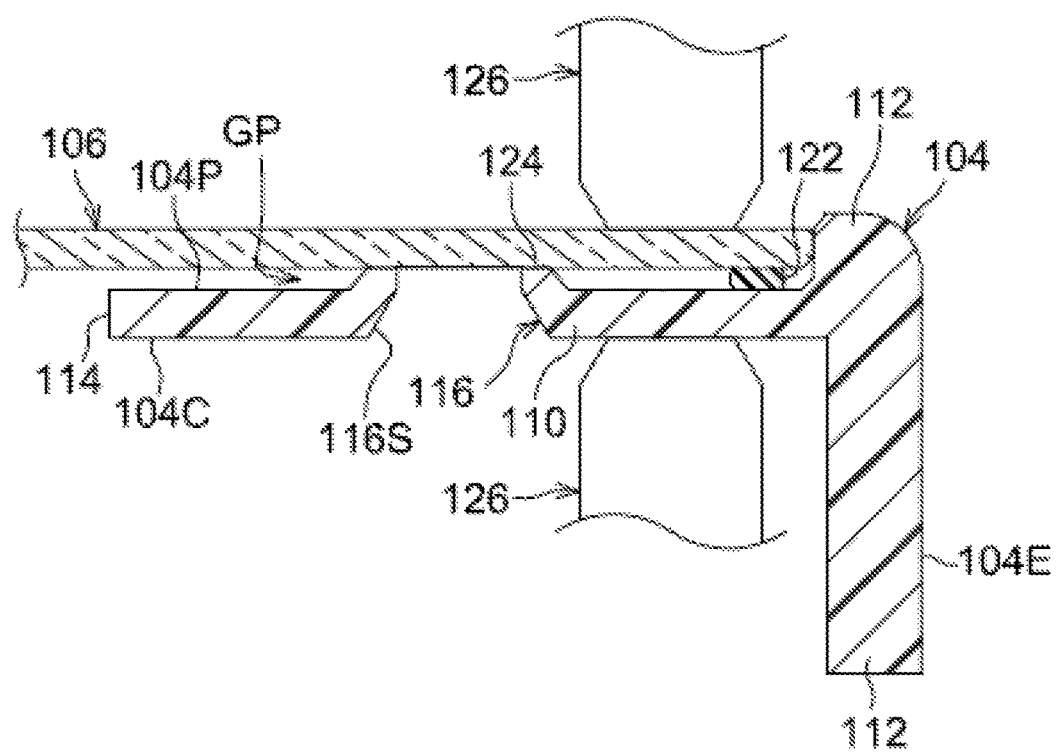
FIG. 6 is a cross-sectional view of the electronic apparatus according to the first embodiment, illustrating a state in which a panel is being mounted to a frame plate.

Then, as illustrated as FIG. 6, a jig 126 or other such tool is used to press the panel 106 against the frame plate 104 until the panel 106 comes into contact with the projection 124, thus compressing the elastic member 122.

Figure 7:
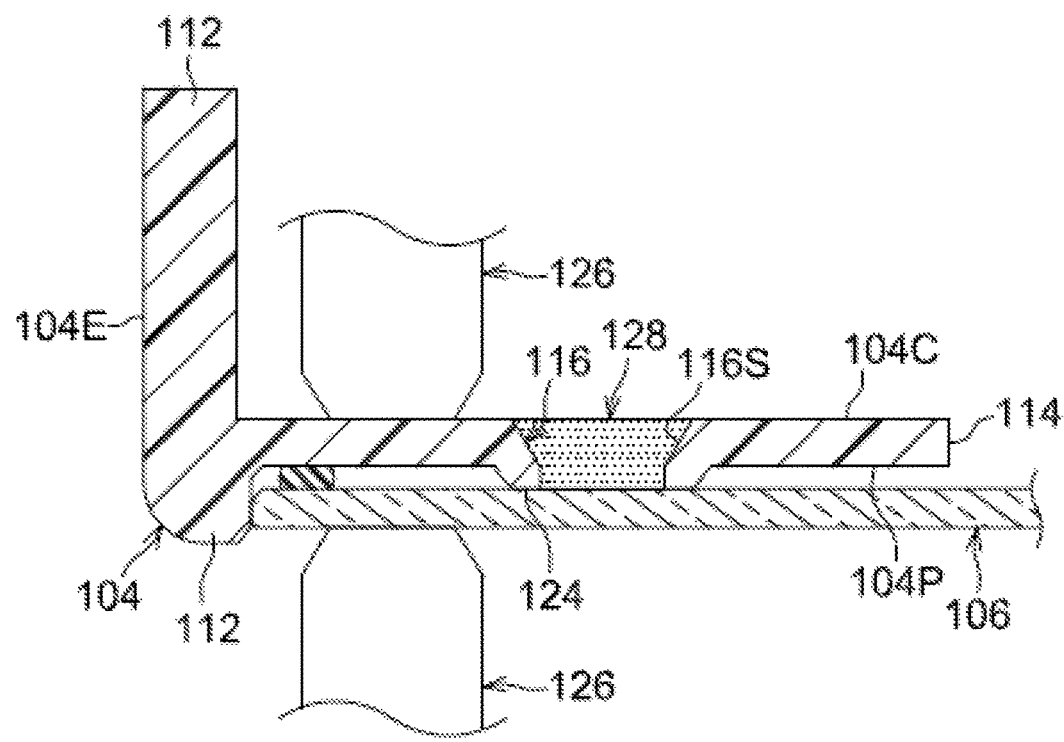
FIG. 7 is a cross-sectional view of the electronic apparatus according to the first embodiment, illustrating a state in which a panel is being mounted to a frame plate.

Thereafter, as illustrated as FIG. 7, uncured adhesive 128 is applied onto the through-hole 116 from the same side as the cover-mounting surface 104C, and a part of the bonding member 118 is brought into contact with the panel 106. In applying the bonding member 118 onto the through-hole 116, application of the bonding member 118 from the same side as the cover-mounting surface 104C is easy if performed with the cover-mounting surface 104C oriented to face upward.

Then, the pressing of the panel 106 against the frame plate 104 (the compression of the elastic member 122) is maintained until the bonding member 118 cures. After the bonding member 118 cures, the pressing of the panel 106 is released (the jig 126 is removed).

In this state, the bonding member 118 is bonded on the panel 106 as illustrated as FIG. 3. At this time, the contact portion 118T that contacts the inclined surface 116S of the through-hole 116 is created in the bonding member 118. As a result, the frame plate 104 is sandwiched by the panel 106 and the contact portion 118T, thus achieving a state in which the panel 106 is mounted to the frame plate 104.

Now, a case is considered where, for example, the panel 106 attempts to move in the direction away from the frame plate 104 (in the direction of the arrow C1). At this time, the contact portion 118T of the bonding member 118 is in contact with the frame plate 104 on the side opposite to the panel 106 (on the same side as the cover-mounting surface 104C). Thus, the contact portion 118T acts as an anchor against such movement. This helps minimize movement of the panel 106 away from the frame plate 104 in the direction of the arrow C1 and the consequent detachment of the panel 106 from the frame plate 104. For instance, detachment or displacement of the panel 106 from the frame plate 104 may be minimized even if the bonding member 118 has a lower bond strength to the frame plate 104 than to the panel 106.

In mounting the panel 106 to the frame plate 104, it would be also conceivable to mount the panel 106 to the frame plate 104 by, for example, using an adhesive tape.

For configurations using an adhesive tape, increased bond strength may be accomplished by increasing the area of contact of the adhesive tape. However, depending on the case, structural constraints or other factors may limit the width or length of the adhesive tape to be used. Moreover, increasing the contact area of the adhesive tape may, in some cases, make the adhesive tape visible from the outside, causing degradation of outward appearance.

In this regard, the configuration according to the first embodiment does not use an adhesive tape, which reduces structural constraints in achieving secure mounting of the panel 106 to the frame plate 104. Further, the absence of an adhesive tape that is visible from the outside of the electronic apparatus 102 ensures that there is no degradation of outward appearance.

Another conceivable method for mounting the panel 106 to the frame plate 104 would be to directly bond the panel 106 to the frame plate 104 by use of adhesive. To accomplish direct bonding of the panel 106 to the frame plate 104 by use of adhesive, however, a material that exhibits a sufficient bond strength is to be used as the adhesive. If, for instance, a specific resin material such as polyamide or polypropylene is used for the frame plate 104, situations may arise where the adhesive used exhibits a low bond strength to such a resin material.

In accordance with the first embodiment, the adhesive (the bonding member 118) may not have to bond to the frame plate 104. This reduces restrictions on the choice of the material of the frame plate 104. For example, even a material to which the adhesive exhibits a low bond strength (examples of such materials include polyamide and polypropylene mentioned above) may be used as the material of the frame plate 104. Since restrictions on the choice of the adhesive (the bonding member 118) used are also reduced, it is also possible to use, for example, a so-called "instant adhesive", which is a type of adhesive that cures in a short time to provide a sufficient bond strength. Use of such an "instant adhesive" allows for reduced manufacturing time of the electronic apparatus 102.

The through-holes 116 are provided along the four edges 104E of the frame plate 104. This allows the panel 106 to be mounted to the frame plate 104 at a plurality of locations along the four edges 104E of the frame plate 104, thus effectively minimizing detachment or displacement of the panel 106 from the frame plate 104.

The electronic apparatus 102 has the elastic member 122. The elastic member 122 is in the shape of a closed curve when viewed in the direction of thickness of the frame plate 104, and in close contact with the frame plate 104 and the panel 106. This configuration helps maintain liquid-tightness of the area located inside the elastic member 122, thus minimizing intrusion of foreign matter such as a liquid or dust into this area.

In particular, the elastic member 122 surrounds the opening 114 of the frame plate 104. This helps minimize contact of foreign matter with various members disposed within the opening 114.

The elastic reaction force of the elastic member 122 acts on the panel 106 in the direction that causes the panel 106 to move away from the frame plate 104 (in the direction of the arrow C1). Since the bonding member 118 is bonded on the panel 106, the bonding member 118 also tends to move in the direction of the arrow C1 together with the panel 106. At this time, the contact portion 118T of the bonding member 118 is in contact with the inclined surface 116S of the through-hole 116. This minimizes movement of the bonding member 118 in the direction of the arrow C1, and also minimizes movement of the panel 106 in the direction of the arrow C1. Moreover, the bonding member 118 is pressed against the frame plate 104 by the elastic reaction force of the elastic member 122. That is, a configuration is achieved in which even if the elastic reaction force of the elastic member 122 acts in the direction that causes the panel 106 to move away from the frame plate 104, this elastic reaction force is effectively utilized to minimize detachment of the panel 106 from the frame plate 104.

The number of through-holes 116 also represents the number of locations where the bonding member 118 is bonded to the panel 106. Accordingly, the number of through-holes 116 may be set such that the sum of the bond strengths exerted by the bonding member 118 at the plurality of through-holes 116 is greater than the elastic reaction force exerted by the elastic member 122. In other words, the elasticity or hardness of the elastic member 122 may be set such that the elastic reaction force exerted by the elastic member 122 does not exceed the sum of the bond strengths exerted by the bonding member 118 at the plurality of bonding locations.

The frame plate 104 includes the projection 124. The projection 124 is an example of a second protrusion, with which the panel 106 comes into contact when pressed toward the frame plate 104 to thereby maintain uniform separation between the frame plate 104 and the panel 106. This helps keep the amount of compression of the elastic member 122 uniform.

The projection 124 is also an example of a first protrusion. The projection 124 surrounds the through-hole 116 in the panel-mounting surface 104P. Consequently, even when the bonding member 118 applied onto the through-hole 116 is in its uncured state, the presence of the projection 124 helps minimize spreading of the uncured adhesive along the panel-mounting surface 104P. Minimizing spreading of the bonding member 118 also helps minimize adhesion of the spreading bonding member 118 to other members or degradation of the outward appearance of the electronic apparatus 102.

The center of the projection 124 is aligned with the center of the through-hole 116. As a result, in comparison to configurations in which the center of the projection 124 is not aligned with the center of the through-hole 116, spreading of the bonding member 118 along the panel-mounting surface 104P may be minimized uniformly across the entire circumference of the through-hole 116.

The projection 124 is integral with the frame plate 104. This configuration reduces the number of components in comparison to forming the projection 124 as a component separate from the frame plate 104. This configuration also helps minimize misalignment of the projection 124 with respect to the frame plate 104.

Although the foregoing description is directed to a case in which the projection 124 doubles as the first protrusion and the second protrusion, the first protrusion and the second protrusion may be provided as separate members. Making the projection 124 double as the first protrusion and the second protrusion reduces the number of components in comparison to forming the first protrusion and the second protrusion as separate members. With this configuration, the panel-mounting surface 104P of the frame plate 104 does not have to be provided with two kinds of protrusions (the first protrusion and the second protrusion). This also allows for effective utilization of the area of the panel-mounting surface 104P.

Figure 8:
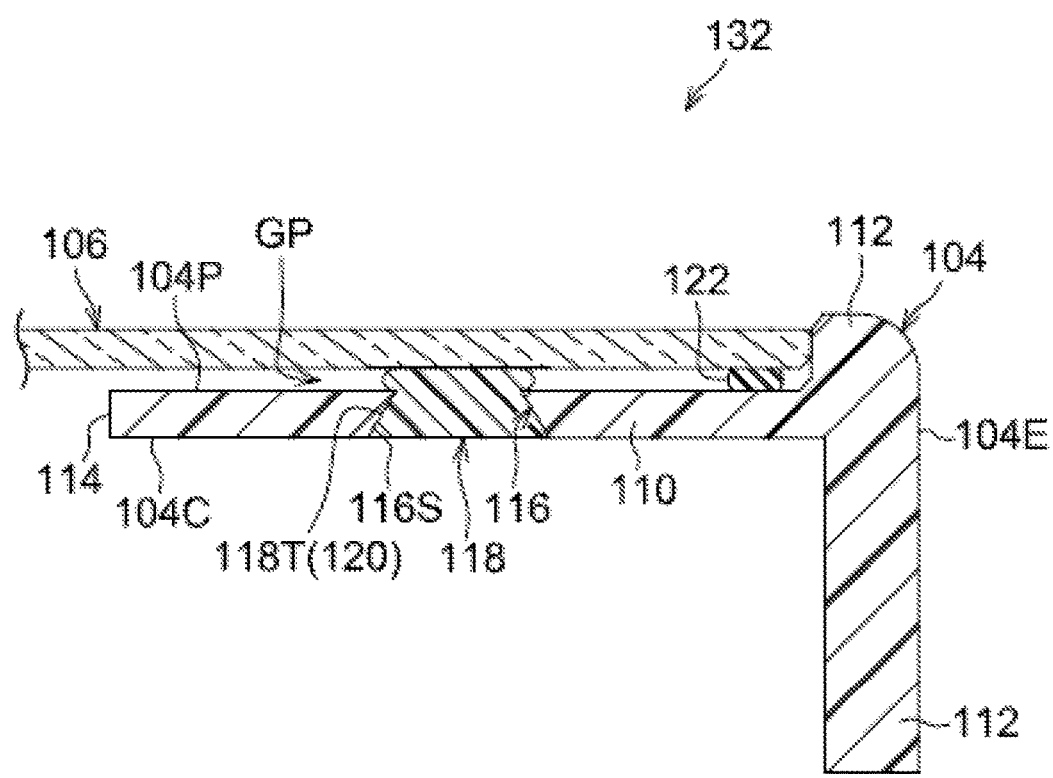
FIG. 8 is a cross-sectional view, similar to the cross-sectional view of FIG. 3, of an electronic apparatus according to a first modification.

The foregoing description is not intended to preclude configurations in which the projection 124 is not provided, as with an electronic apparatus 132 according to a first modification illustrated as FIG. 8. Even if the projection 124 is not provided, the amount of compression of the elastic member 122 may be made uniform by, for example, applying the uncured adhesive 128 onto the through-hole 116 while keeping the gap GP between the panel 106 and the frame plate 104 uniform by use of the jig 126 or other such tool. Further, adjusting the amount of adhesive at the time of its application may help minimize spreading of the adhesive along the panel-mounting surface 104P.

According to the first embodiment, the contact portion 118T, which is an example of the opposed member 120, may be formed by providing the through-hole 116 with the inclined surface 116S. That is, the opposed member 120 may be formed by simply applying the bonding member 118 onto the through-hole 116, thus allowing for easy formation of the opposed member 120.

Although the inclined surface 116S may be provided in a part of the surface defining the through-hole 116, the inclined surface 116S is provided around the entire circumference of the through-hole 116 in accordance with the first embodiment. Providing the inclined surface 116S around the entire circumference of the through-hole 116 ensures that the contact portion 118T of the bonding member 118 is also in contact with the inclined surface 116S around the entire circumference of the through-hole 116. This configuration helps provide an increased contact area between the contact portion 118T and the inclined surface 116S, in comparison to providing the inclined surface 116S in a part of the surface defining the through-hole 116.

The opposed member 120 is provided as the contact portion 118T that constitutes a part of the bonding member 118. This configuration reduces the number of components in comparison to providing an opposed member as a component separate from a bonding member.

The panel 106 covers the opening 114 of the frame plate 104. Since the panel 106 covers substantially the entire panel-mounting surface 104P of the frame plate 104, this configuration ensures a large display surface for cases where, for example, the panel 106 is used as a display.

Next, a second embodiment will be described. In the following description of the second embodiment, elements, members, or other features similar to those of the first embodiment will be designated by the same reference signs, and will not be described in further detail. Further, for each of embodiments described below, the overall shape and configuration of the corresponding electronic apparatus may be similar to the shape and configuration of the electronic apparatus 102 illustrated as FIGS. 1 and 2, and thus will not be depicted in the drawings.

Figure 9:
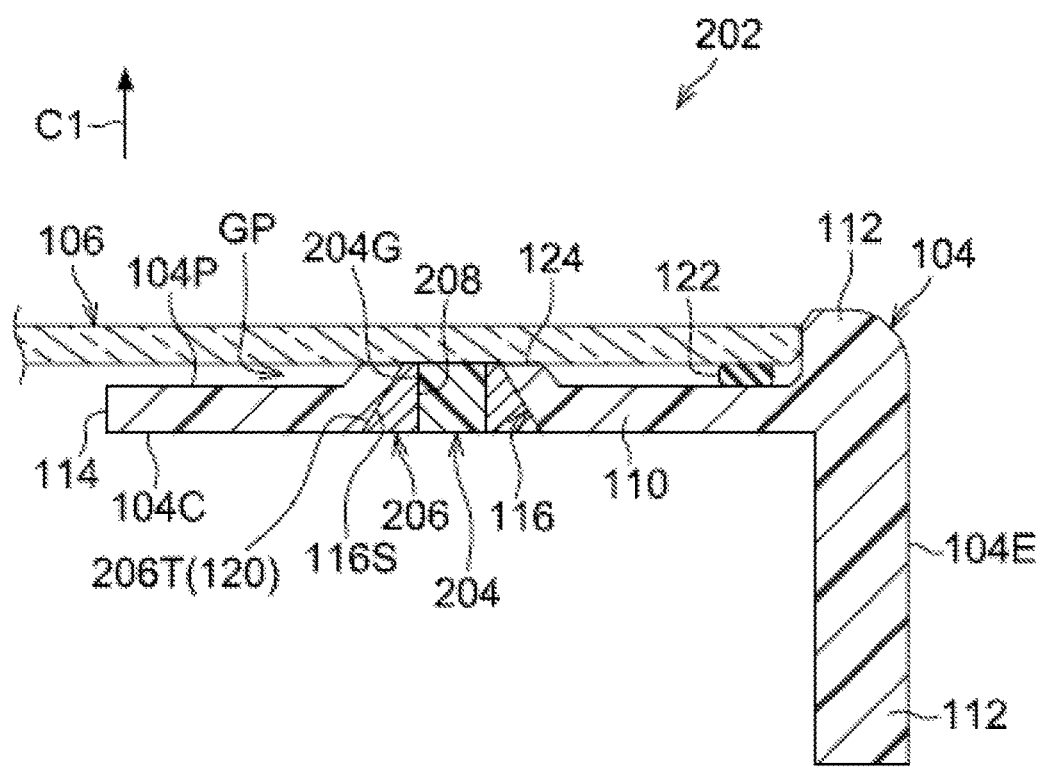
FIG. 9 is a cross-sectional view, similar to the cross-sectional view of FIG. 3, of an electronic apparatus according to a second embodiment.

As illustrated as FIG. 9, an electronic apparatus 202 according to the second embodiment has the following members disposed within the through-hole 116: a bonding member 204, and a fixed member 206 fixed to the bonding member 204.

The bonding member 204 according to the second embodiment is formed by adhesive. The bonding member 204 has a cylindrical shape with a uniform diameter that is smaller than the inner diameter on the same side of the through-hole 116 as the panel 106 (the inner diameter of the small-diameter portion of the through-hole 116). The fixed member 206 is disposed between an outer circumferential surface 204G of the bonding member 204 and the inclined surface 116S of the through-hole 116. The fixed member 206 has a contact portion 206T that is opposed to and in contact with the inclined surface 116S of the through-hole 116. The fixed member 206 is fixed to the bonding member 204 by bonding. In other words, a hole portion 208 is provided in the central portion of the fixed member 206, and the bonding member 204 applied onto the hole portion 208 is bonded to the panel 106. The contact portion 206T of the fixed member 206 represents an example of the opposed member 120.

As described above with reference to the second embodiment, the opposed member 120 may be fixed to the bonding member 204 as a component separate from the bonding member 204. The bonding member 204 is not provided with an opposed member, which helps reduce the size of the bonding member 204. Reducing the size of the bonding member 204 reduces the amount of adhesive used for the bonding member 204, thus enabling uncured adhesive to cure in a shorter time.

The second embodiment enables the panel 106 to be mounted to the frame plate 104 by placing the fixed member 206 in the through-hole 116, bringing the contact portion 206T of the fixed member 206 into contact with the inclined surface 116S, applying uncured adhesive onto the hole portion 208 of the fixed member 206, and then curing the adhesive.

Next, a third embodiment will be described. In the following description of the third embodiment, elements, members, or other features similar to those of the first or second embodiment will be designated by the same reference signs, and will not be described in further detail.

Figure 10:
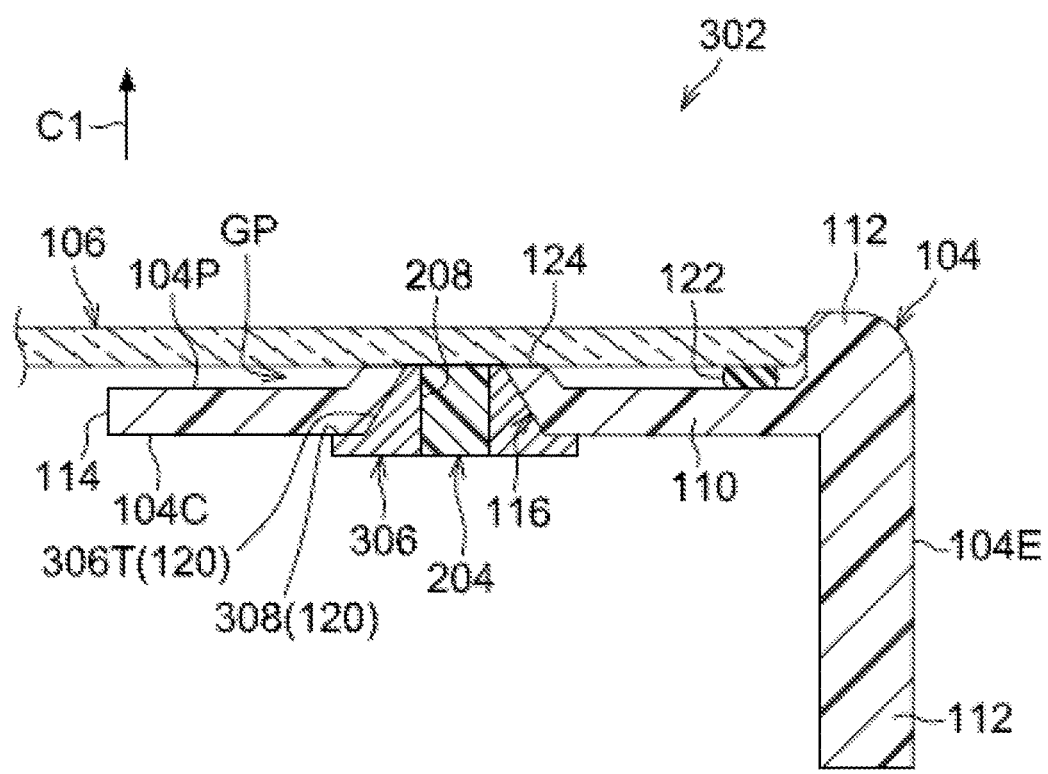
FIG. 10 is a cross-sectional view, similar to the cross-sectional view of FIG. 3, of an electronic apparatus according to a third embodiment.

As illustrated as FIG. 10, an electronic apparatus 302 according to the third embodiment has the bonding member 204, and a fixed member 306 as members disposed within the through-hole 116.

The fixed member 306 has a contact portion 306T that is opposed to and in contact with the inclined surface 116S of the through-hole 116. Further, the fixed member 306 has an enlarged strip 308. The enlarged strip 308 is located closer to the cover 108 (the lower side in FIG. 10) than is the through-hole 116, and enlarged outward from the through-hole 116 along the cover-mounting surface 104C of the frame plate 104. The enlarged strip 308 is opposed to and in contact with the cover-mounting surface 104C of the frame plate 104, at a location outside the through-hole 116. That is, the enlarged strip 308 is opposed to the frame plate 104 on the side opposite to the panel 106.

Thus, according to the third embodiment, the fixed member 306 has not only the contact portion 306T but also the enlarged strip 308. That is, the fixed member 306 is opposed to the frame plate 104 at two locations including the contact portion 306T and the enlarged strip 308. This configuration allows for more secure mounting of the panel 106 to the frame plate 104, even when the fixed member 306 is subjected to a force acting in the direction of the arrow C1 (in the direction that causes the panel 106 to move away from the frame plate 104).

Next, a fourth embodiment will be described. In the following description of the fourth embodiment, elements, members, or other features similar to those of any one of the first to third embodiments will be designated by the same reference signs, and will not be described in further detail.

Figure 11:
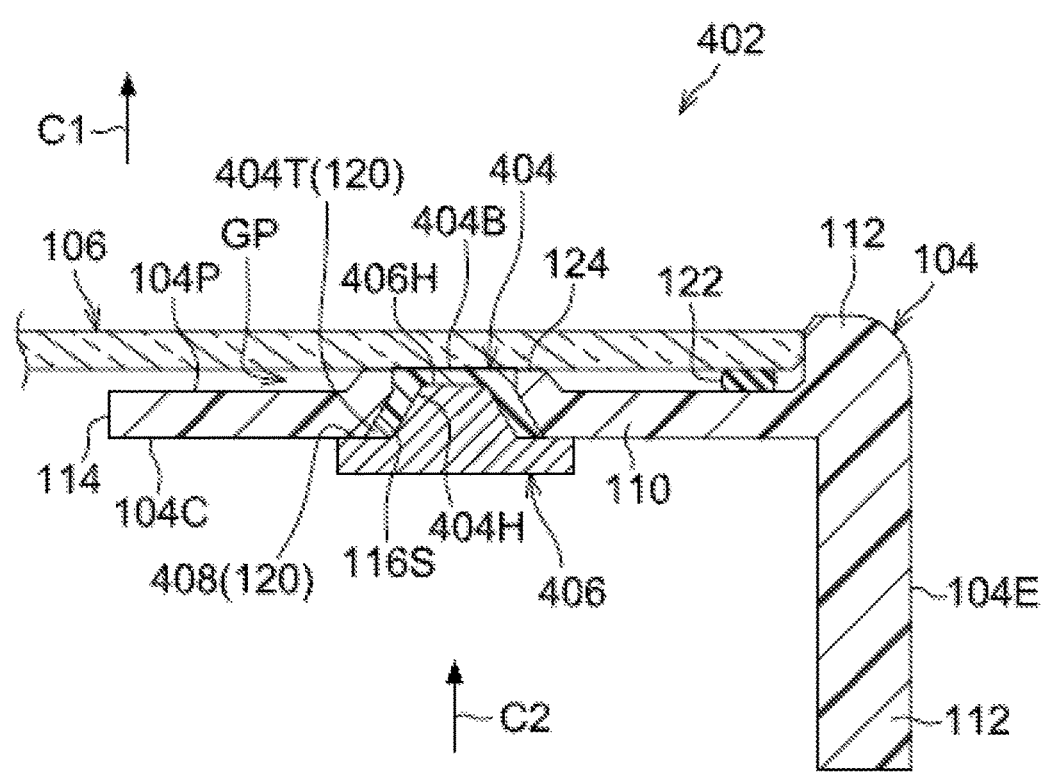
FIG. 11 is a cross-sectional view, similar to the cross-sectional view of FIG. 3, of an electronic apparatus according to a fourth embodiment.

As illustrated as FIG. 11, an electronic apparatus 402 according to the fourth embodiment includes a bonding member 404 applied onto the inside of the through-hole 116. The bonding member 404 has a basal portion 404B, and a contact portion 404T. The basal portion 404B is bonded to the panel 106. The contact portion 404T extends contiguously from the periphery of the basal portion 404B, and is opposed to and in contact with the inclined surface 116S of the through-hole 116. That is, when viewed from the same side as the cover 108 (along an arrow C2), the shape of the bonding member 404 according to the fourth embodiment is such that the bonding member 404 has a recess 404H in the central portion.

A fixed member 406 is disposed in the recess 404H of the bonding member 404. The fixed member 406 has a contained portion 406H, and an enlarged strip 408. The contained portion 406H is contained within the recess 404H. The enlarged strip 408 extends contiguously from the contained portion 406H and, on the same side as the cover 108, the enlarged strip 408 is enlarged outward from the through-hole 116 along the cover-mounting surface 104C of the frame plate 104. The enlarged strip 408 is opposed to and in contact with the cover-mounting surface 104C of the frame plate 104, at a location outside the through-hole 116. That is, the enlarged strip 408 is opposed to the frame plate 104 on the side opposite to the panel 106.

Thus, according to the fourth embodiment, the bonding member 404 has the contact portion 404T, and the fixed member 406 has the enlarged strip 408. The presence of the two opposed members 120 allows for more secure mounting of the panel 106 to the frame plate 104, even when the panel 106 is subjected to a force acting in the direction of the arrow C1 (in the direction that causes the panel 106 to move away from the frame plate 104).

Further, in comparison to, for example, forming the enlarged strip 408 by the bonding member 404, the configuration according to the fourth embodiment allows for reduced amount of adhesive used for the bonding member 404. This enables uncured adhesive to cure in a shorter time.

Next, a fifth embodiment will be described. In the following description of the fifth embodiment, elements, members, or other features similar to those of any one of the first to fourth embodiments will be designated by the same reference signs, and will not be described in further detail.

Figure 12:
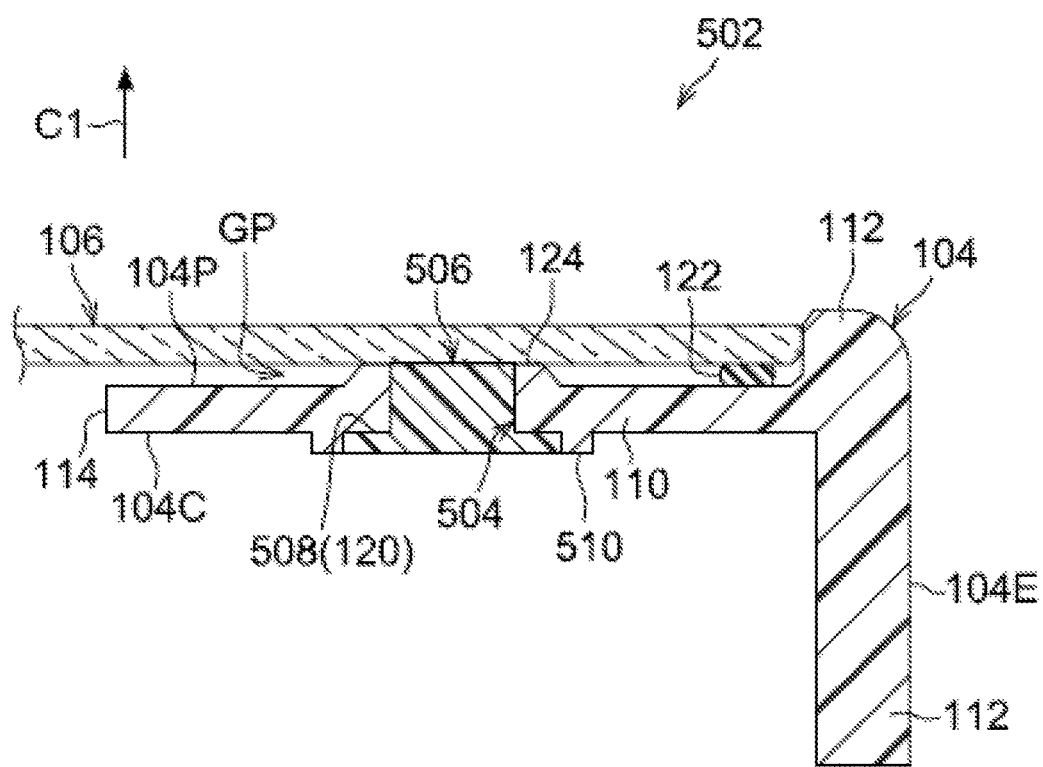
FIG. 12 is a cross-sectional view, similar to the cross-sectional view of FIG. 3, of an electronic apparatus according to a fifth embodiment.

As illustrated as FIG. 12, with an electronic apparatus 502 according to the fifth embodiment, a through-hole 504 in the frame plate 104 has a uniform cross-sectional shape in the direction of thickness of the frame plate 104, and is not provided with the inclined surface 116S (see FIG. 3 or other figures). The expression "uniform cross-sectional shape" as used herein means that the cross-section of the frame plate 104 taken at a given location along the thickness of the frame plate 104 is uniform regardless of this location. For example, if the through-hole 504 is in the shape of a cylinder or prism, then the through-hole 504 corresponds to such a through-hole having a "uniform cross-sectional shape".

A bonding member 506, which is applied onto the through-hole 504, has an enlarged portion 508 in a part of the bonding member 506. The enlarged portion 508 is enlarged outward from the through-hole 504 on the same side as the cover-mounting surface 104C. The enlarged portion 508 is opposed to and in contact with the cover-mounting surface 104C, and represents an example of the opposed member 120.

The cover-mounting surface 104C of the frame plate 104 includes a projection 510. The projection 510, which is provided in correspondence with each of the through-holes 504, is in the shape of a closed curve (circular shape in the example of FIG. 12) surrounding the through-hole 504. The presence of the projection 510 substantially increases the height of the through-hole 504 as viewed from the cover-mounting surface 104C. The projection 510 represents an example of a third protrusion.

In accordance with the fifth embodiment, the enlarged portion 508 is opposed to the frame plate 104 on the side opposite to the panel 106. This configuration enables mounting of the panel 106 to the frame plate 104. This configuration also helps minimize detachment of the panel 106 when the panel 106 attempts to move in the direction away from the frame plate 104 (in the direction of the arrow C1).

According to the fifth embodiment, the through-hole 504 has a uniform cross-sectional shape, and no inclined surface is provided in the surface defining the through-hole 504. This allows the through-hole 504 to be formed easily.

As with the first embodiment, the opposed member 120 is provided as a part of the bonding member 118. This configuration reduces the number of components in comparison to providing an opposed member as a component separate from a bonding member.

With the configuration according to the fifth embodiment as well, a larger and circumferentially contiguous contact portion 508 may be provided in comparison to a configuration in which the enlarged portion 508 contacts the frame plate 104 in a part of the through-hole 504 with respect to the circumferential direction of the through-hole 504.

According to the fifth embodiment, the presence of the projection 510, which is an example of a third protrusion, increases the height of the through-hole 504. As a result, a greater amount of adhesive may be applied onto the through-hole 504 for use as the bonding member 506. In particular, according to the fifth embodiment, the presence of the projection 510 limits the area over which adhesive spreads out in the enlarged portion 508, thus effectively allowing formation of the enlarged portion 508 with a uniform shape.

The projection 510 may be integrated with the frame plate 104. This configuration reduces the number of components in comparison to providing the projection 510 as a component separate from the frame plate 104.

Next, a sixth embodiment will be described. In the following description of the sixth embodiment, elements, members, or other features similar to those of any one of the first to fifth embodiments will be designated by the same reference signs, and will not be described in further detail.

Figure 13:
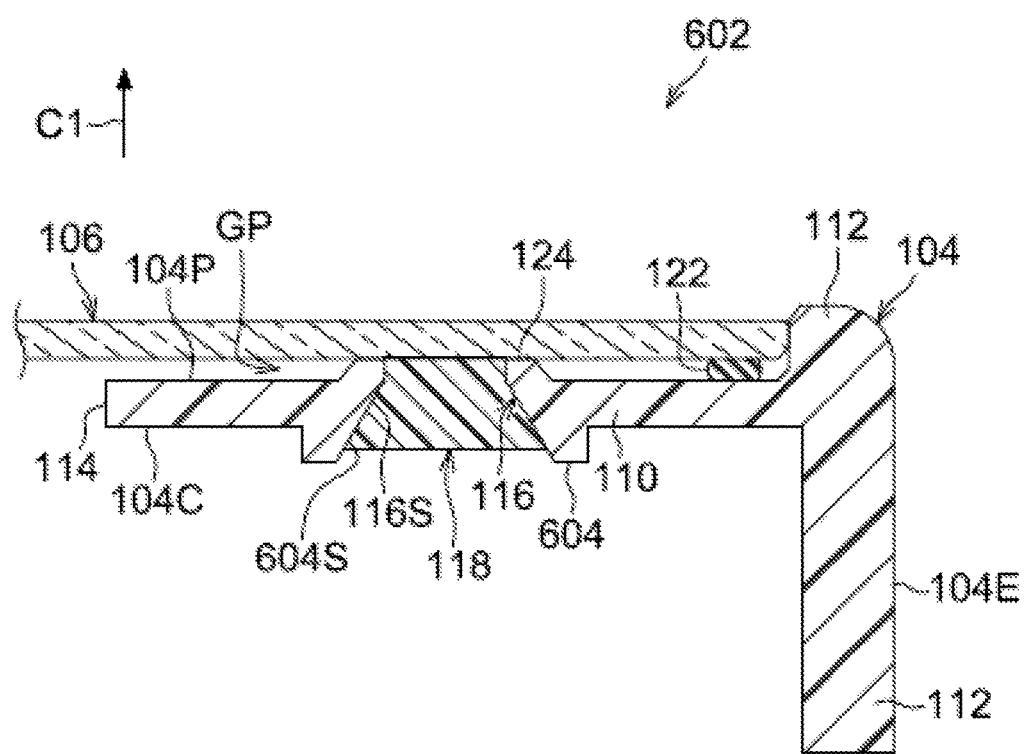
FIG. 13 is a cross-sectional view, similar to the cross-sectional view of FIG. 3, of an electronic apparatus according to a sixth embodiment.

As illustrated as FIG. 13, an electronic apparatus 602 according to the sixth embodiment includes a projection 604. The projection 604, which is provided in correspondence with each of the through-holes 116, is in the shape of a closed curve (circular shape in the example of FIG. 13) surrounding the through-hole 116. The presence of the projection 604 substantially increases the height of the through-hole 116 as viewed from the cover-mounting surface 104C. The projection 604 represents an example of a third protrusion.

In accordance with the sixth embodiment, the inner circumferential surface of the projection 604 includes an inclined surface 604S. The inclined surface 604S of the projection 604 is contiguous to the inclined surface 116S of the through-hole 116. The bonding member 118 is applied over an area extending from inside the through-hole 116 to the inclined surface 604S of the projection 604.

According to the sixth embodiment, the area over which the bonding member 118 contacts the frame plate 104 on the same side as the cover-mounting surface 104C is thus increased in comparison to a configuration in which the projection 604 is not provided. This allows for more secure mounting of the panel 106 to the frame plate 104.

According to the sixth embodiment as well, the presence of the projection 604 substantially increases the height of the through-hole 116. As a result, a greater amount of adhesive may be applied onto the through-hole 116 for use as the bonding member 118. Further, the presence of the projection 604 limits the area over which adhesive spreads.

Next, a seventh embodiment will be described. In the following description of the seventh embodiment, elements, members, or other features similar to those of any one of the first to sixth embodiments will be designated by the same reference signs, and will not be described in further detail.

Figure 14:
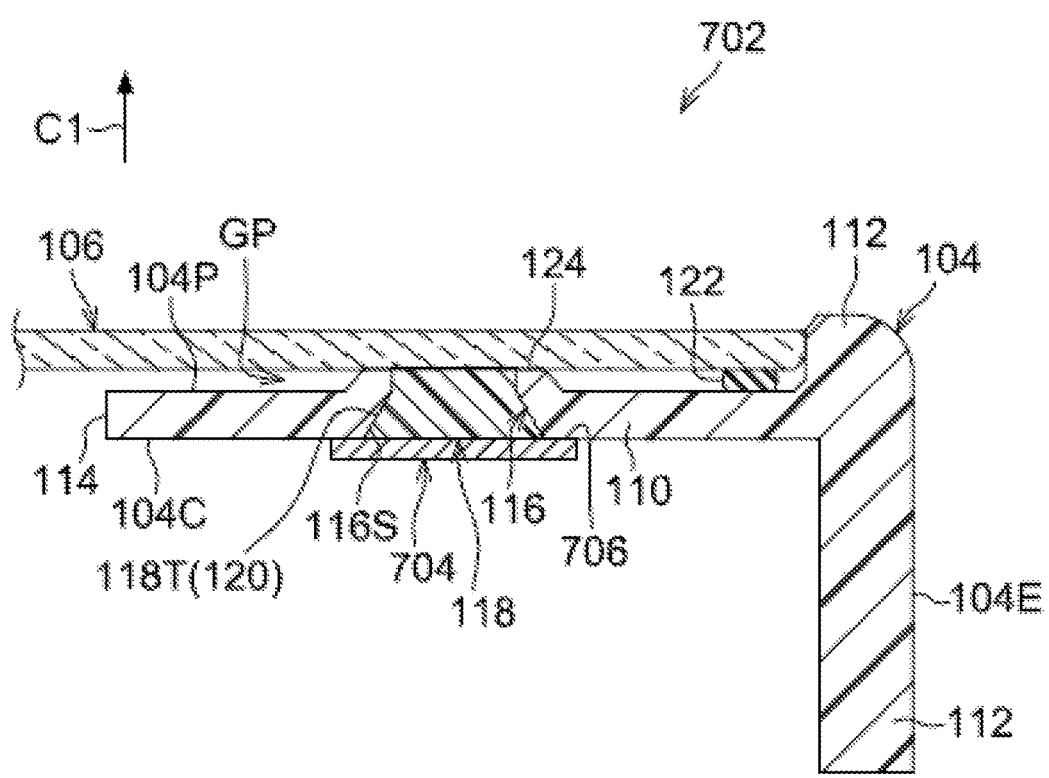
FIG. 14 is a cross-sectional view, similar to the cross-sectional view of FIG. 3, of an electronic apparatus according to a seventh embodiment.
Figure 15A:
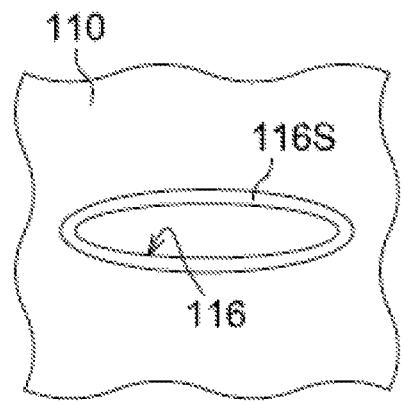
FIG. 15A illustrates an exemplary shape of a through-hole.
Figure 15D:
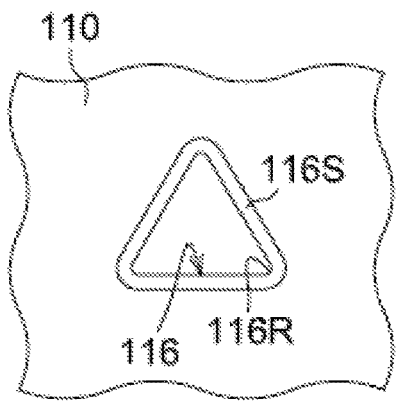
FIG. 15D illustrates an exemplary shape of a through-hole.
Figure 15B:
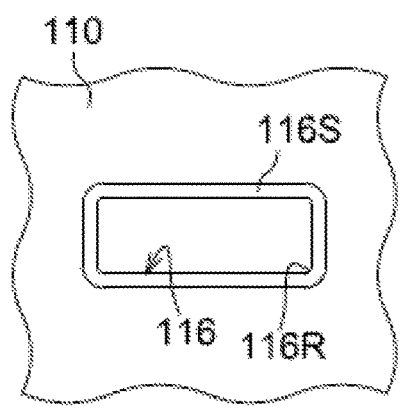
FIG. 15B illustrates an exemplary shape of a through-hole.
Figure 15E:
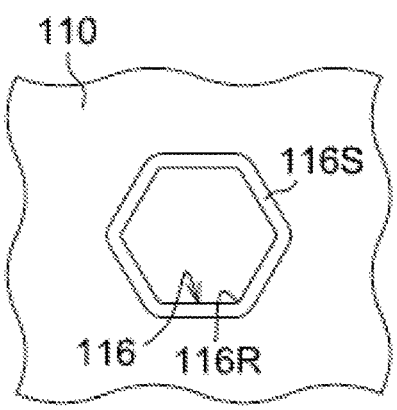
FIG. 15E illustrates an exemplary shape of a through-hole.
Figure 15C:
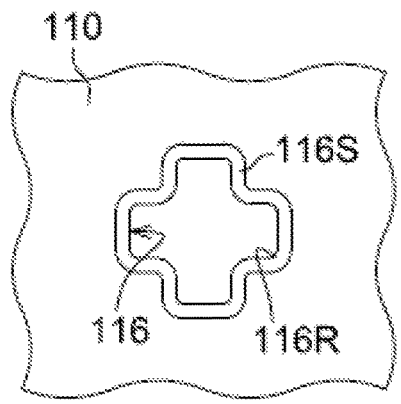
FIG. 15C illustrates an exemplary shape of a through-hole.

As illustrated as FIG. 14, an electronic apparatus 702 according to the seventh embodiment has a fixed plate 704 bonded and fixed to the bonding member 118. The fixed plate 704 has an enlarged strip 706. The enlarged strip 706 is opposed to and in contact with the cover-mounting surface 104C of the frame plate 104, at a location outside the through-hole 116. That is, the enlarged strip 706 is opposed to the frame plate 104 on the side opposite to the panel 106. The fixed plate 704 represents an example of the opposed member 120.

Thus, according to the seventh embodiment, the bonding member 118 has the contact portion 118T, and the fixed plate 704 has the enlarged strip 706. The presence of the two opposed members 120 allows for more secure mounting of the panel 106 to the frame plate 104, even when the panel 106 is subjected to a force acting in the direction of the arrow C1 (in the direction that causes the panel 106 to move away from the frame plate 104).

Moreover, in comparison to, for example, forming the enlarged strip 706 by the bonding member 118, the configuration according to the seventh embodiment allows for reduced amount of adhesive used for the bonding member 118. This enables uncured adhesive to cure in a shorter time.

Although each of the above-mentioned embodiments is directed to a case in which the opposed member 120 is in contact with the frame plate 104 on the side opposite to the panel 106 (on the same side as the cover-mounting surface 104C), the opposed member 120 may not be in contact with the frame plate 104 but may be simply opposed to the frame plate 104. That is, if the opposed member 120 is opposed to the frame plate 104 on the side opposite to the panel 106 (on the same side as the cover-mounting surface 104C), then partial contact of the opposed member 120 with the frame plate 104 is accomplished when the panel 106 moves away from the frame plate 104 (in the direction of the arrow C1).

Although in each of the above-mentioned embodiments the through-hole 116 or 504 has a circular shape when viewed in the direction in which the through-hole 116 or 504 penetrates the frame plate 104, that is, in the direction of thickness of the frame plate 104, the shape of the through-hole 116 or 504 is not limited to a circular shape. Other exemplary shapes of the through-hole 116 or 504 include the elliptical shape illustrated as FIG. 15A, the rectangular shape illustrated as FIG. 15B, the "cross" shape illustrated as FIG. 15C, the triangular shape illustrated as FIG. 15D, and the hexagonal shape as illustrated as FIG. 15E. Although FIGS. 15A to 15E illustrate the through-hole 116 having the inclined surface 116S, even the through-hole 504 that does not have an inclined surface may take various shapes.

In applying uncured adhesive onto the through-hole 116, which may take the various shapes mentioned above, such an adhesive has a predetermined viscosity even in its uncured state. Accordingly, if the through-hole 116, which may have the various shapes illustrated as FIGS. 15B to 15E, is rounded at the corners to form a curved portion 116R, this configuration helps reduce areas into which adhesive does not readily flow.

Although a frame plate having the opening 114 has been described above as an example of a mounting plate, a plate-like member without the opening 114 may be also used as the mounting plate.

A member that functions as a display of an electronic apparatus has been described above as an example of a panel. In this regard, the panel may be an electronic component such as a touch panel having wires provided inside the display to allow the user of the electronic apparatus 102 to make inputs to the electronic apparatus 102 through touch operations. Further, the panel may be a member that constitutes the outward appearance of the electronic apparatus 102 without functioning as, for example, a display or a touch panel. Employing the configuration according to each of the above embodiments mentioned above for each type of panel enables the panel to be mounted to the frame plate 104 (mounting plate) without using a screw hole, a boss hole, or other mounting structures (such as a recess). In other words, this configuration enables mounting of the panel to the frame plate 104 (mounting plate) even for cases where it is difficult or not desirable to provide the panel with the screw hole, boss hole, or other mounting structures (such as a recess) mentioned above.

Examples of electronic apparatuses other than the tablet computer mentioned above include a smartphone, a cellular phone, a notebook computer, and a display device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic apparatus comprising:
   a mounting plate;
   a panel mounted to the mounting plate;
   a through-hole that penetrates the mounting plate in a direction of thickness of the mounting plate;
   a bonding member that is buried in the through-hole and fixes the panel to the mounting plate; and
   a first protrusion that surrounds the through-hole, the first protrusion being disposed on a mounting surface of the mounting plate to which the panel is mounted,
   an opening of the through-hole gradually grows larger in the direction of the thickness of the mounting plate from a side where the panel is mounted.

2. The electronic apparatus according to claim 1, wherein the mounting plate has a center aligned with a center of the through-hole.

3. The electronic apparatus according to claim 1, wherein the first protrusion is integral with the mounting plate.

4. The electronic apparatus according to claim 1, further comprising an elastic member disposed between the mounting plate and the panel and compressed by the mounting plate and the panel.

5. The electronic apparatus according to claim 4, wherein the elastic member has a shape of a closed curve when viewed in the direction of thickness of the mounting plate.

6. The electronic apparatus according to claim 5,
   wherein the mounting plate is in a form of a frame having an opening, and
   wherein the elastic member having the shape of the closed curve surrounds the opening.

7. The electronic apparatus according to claim 6, wherein the panel covers the opening.

8. The electronic apparatus according to claim 4, further comprising a second protrusion located between the mounting plate and the panel, the second protrusion contacting both the mounting plate and the panel when the elastic member is being compressed.

9. The electronic apparatus according to claim 8, wherein the second protrusion is integral with the mounting plate.

10. The electronic apparatus according to claim 8, wherein the first protrusion doubles as the second protrusion.

11. The electronic apparatus according to claim 1, wherein a surface defining the through-hole includes an inclined surface being inclined toward a center of the through-hole in a direction in which the panel moves away from the mounting plate.

12. The electronic apparatus according to claim 11, wherein the inclined surface extends around an entire circumference of the surface defining the through-hole.

13. The electronic apparatus according to claim 1, further comprising an opposed member embedded in the through-hole and includes an enlarged portion enlarged outward from the through-hole.

14. The electronic apparatus according to claim 13, wherein the enlarged portion extends around an entire circumference of the through-hole.

15. The electronic apparatus according to claim 1, further comprising a third protrusion that surrounds the through-hole, the third protrusion being disposed on a surface of the mounting plate opposite to a mounting surface to which the panel is mounted.

16. The electronic apparatus according to claim 15, wherein the third protrusion is integral with the mounting plate.

17. The electronic apparatus according to claim 1, wherein the through-hole comprises a plurality of through-holes disposed along an edge of the mounting plate.

* * * * *